(12) United States Patent
Bond (10) Patent No.: US 11,145,313 B2
(45) Date of Patent: Oct. 12, 2021

(54) SYSTEM AND METHOD FOR ASSISTING COMMUNICATION THROUGH PREDICTIVE SPEECH

(71) Applicant: Michael Bond, Marietta, OH (US)

(72) Inventor: Michael Bond, Marietta, OH (US)

(*) Notice: Subject to any disclaimer, the term of this patent is extended or adjusted under 35 U.S.C. 154(b) by 181 days.

(21) Appl. No.: 16/502,119

(22) Filed: Jul. 3, 2019

(65) Prior Publication Data

US 2020/0013410 A1 Jan. 9, 2020

Related U.S. Application Data (60) Provisional application No. 62/694,467, filed on Jul. 6, 2018.

(51) Int. Cl.
| | | |
|---|---|---|
| *G10L 17/06* | (2013.01) | |
| *G10L 15/22* | (2006.01) | |
| *G10L 13/02* | (2013.01) | |
| *G10L 13/08* | (2013.01) | |
| *G10L 15/30* | (2013.01) | |

(52) U.S. Cl.
CPC ............. *G10L 17/06* (2013.01); *G10L 13/02* (2013.01); *G10L 13/08* (2013.01); *G10L 15/22* (2013.01); *G10L 15/30* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 7,904,298 B2* | 3/2011 | Rao | ........................ | G10L 15/22 704/270 |
| 8,762,852 B2* | 6/2014 | Davis | ..................... | G06F 3/162 715/727 |
| 9,183,580 B2* | 11/2015 | Rhoads | ................. | G06F 9/3885 |
| 9,257,122 B1* | 2/2016 | Cancro | .................. | G10L 25/03 |
| 9,300,645 B1* | 3/2016 | Rao | ........................ | G06F 3/017 |
| 2008/0120102 A1* | 5/2008 | Rao | ........................ | G10L 15/22 704/235 |
| 2012/0134548 A1* | 5/2012 | Rhoads | ................. | G06F 9/3885 382/118 |
| 2012/0208592 A1* | 8/2012 | Davis | ............... | H04N 5/232945 455/556.1 |
| 2012/0214436 A1* | 8/2012 | Clark | .................... | H04W 4/029 455/404.2 |

(Continued)

OTHER PUBLICATIONS

Wikipedia, Autocomplete definition webpage, Jul. 2, 2019, 8 pages.

(Continued)

*Primary Examiner* — Marcus T Riley
(74) *Attorney, Agent, or Firm* — Standley Law Group LLP; Adam J. Smith; Jeffrey S. Standley (57) ABSTRACT

A system and method for assisting communication through predictive speech is provided. A database includes commonly used words, phrases, and images, each associated with at least one context cue. A processor is configured to determine the user's context and display a number of possible initial words, phrases, or images associated with the determined context. A text field is updated with selected words, phrases, or images. The words, phrases, or literal equivalents of the images are audibly transmitted.

20 Claims, 4 Drawing Sheets

(56) References Cited

U.S. PATENT DOCUMENTS

| | | | | |
|---|---|---|---|---|
| 2012/0284012 A1* | 11/2012 | Rodriguez | ............. | G06Q 30/06 |
| | | | | 704/1 |
| 2014/0143064 A1* | 5/2014 | Tran | ...................... | A61B 5/747 |
| | | | | 705/14.66 |
| 2015/0079562 A1* | 3/2015 | Yeh | ..................... | G06F 3/017 |
| | | | | 434/247 |
| 2015/0098309 A1* | 4/2015 | Adams | ................... | G04G 21/06 |
| | | | | 368/10 |
| 2016/0188205 A1* | 6/2016 | Rao | ....................... | H04L 63/08 |
| | | | | 715/773 |
| 2016/0224524 A1* | 8/2016 | Kay | ...................... | G06F 3/0236 |
| 2016/0277572 A1* | 9/2016 | Benich | ............... | H04L 65/1046 |
| 2018/0150143 A1* | 5/2018 | Orr | ........................ | G06N 3/084 |
| 2018/0160259 A1* | 6/2018 | Connors | ................ | H04W 4/70 |
| 2018/0191788 A1* | 7/2018 | Lewis | .................. | G10L 15/1822 |
| 2020/0013410 A1* | 1/2020 | Bond | ...................... | G10L 13/02 |

OTHER PUBLICATIONS

Apple Support, iPhone User Guide, Use predictive text on iPhone, webpage, Jul. 2, 2019, 3 pages.

\* cited by examiner

SYSTEM AND METHOD FOR ASSISTING COMMUNICATION THROUGH PREDICTIVE SPEECH

CROSS-REFERENCE TO RELATED APPLICATIONS

This application claims the benefit of U.S. Provisional Application Ser. No. 62/694,467 filed Jul. 6, 2018, the disclosures of which are hereby incorporated by reference as if fully restated herein.

TECHNICAL FIELD

Exemplary embodiments relate generally to systems and methods for assisting communication, particularly for those who have difficulty speaking, by generating predictive words or phrases based on context, thereby permitting faster and more accurate communication.

BACKGROUND AND BRIEF SUMMARY OF THE INVENTION

Verbal communication is often taken for granted. It becomes so "second nature" that individuals often forget that everyone enters this world speechless. Many individuals go through life never worrying about their ability to verbally communicate with others. However, many others are not afforded the same luxury.

For those who suffer from a speech related ailment, such as a stroke, nonverbal autism, throat surgery, or ALS, to name just a few examples, the person needs to communicate quickly and efficiently using a language they already know. To this end, healthcare facilities generally employ simple preprinted cards with words or pictures to help facilitate communication with patients who have difficulty speaking. These rudimentary cards severely limit the person's ability to accurately express their inner thoughts. There is little or no room for variation. The cards do not take into account the mental capacity of the patient. Beyond asking for the essentials to live, such as water, food, toilet, there is no meaningful dialogue that may be exchanged with doctors and loved ones.

Attempts have been made to give people who have difficulty speaking a voice through interactive programs on electronic handheld devices. However, these programs are largely just digitized forms of the same cards that hospitals show to patients. There is little to no room to accurately express inner thoughts and have meaningful conversations. This is a common problem among Augmentative and Alternative Communication ("AAC") systems. Today's AAC systems are generally limited to slow communication for the bare essentials.

Certain words are generally spoken in the context of what was already spoken. For example, certain phrases and statements are often made in response to certain statements made by others. As a further example, some words or phrases are more commonly used in connection with words already spoken by the person in order to form a complete sentence or further statements. Furthermore, people tend to use certain words or phrases more often than others. Some of this may be due to culture, upbringing, or personality. Often times, people use particular words or phrases depending on what is spoken to them, their location, who they are speaking to, or other contextual considerations. As such, the wide number of possible words or phrases to use can sometimes be limited based on context. Therefore, what is needed is a system and method which permits those who have difficulty speaking to effectively and quickly communicate to those around them with assistance of an electronic device, particularly one where words and phrases to be audibly transmitted are made available to the user in a predictive fashion based on context.

The present disclosures provide a system and method which permits those without the ability to speak, or with speech difficulties, to effectively and quickly communicate to those around them with assistance of an electronic device based on context. In exemplary embodiments, words and phrases for potential selection may be generated in a predictive fashion based on one or more context cues. These context cues may include user preferences, time of day, location, audience, some combination thereof, or the like. The predicted words and phrases may be selected based on words and phrases used in the same or similar contexts by the user. Alternatively, or additionally, the predicted words and phrases may be selected based on context such as what is spoken to the user, the user's location, the user's audience, some combination thereof, or the like.

The present disclosures provide an easy to use interface that updates quickly to enable the user to easily select a following word or phrase based on context cues. This interface may appear on any electronic device, preferably a portable device such as a smart phone, laptop, tablet, or the like. The interface may comprise text that previews the words or phrases about to be spoken by the electronic device. The text may be updated with each new word(s) or phrase input by the user. The user may have the option to type the next word(s) or phrase they wish to speak or select a word(s) or phrase from displayed list of words, phrases, and/or pictures. As each new word or picture is typed, selected, or otherwise indicated, the text may be updated and a new set of words or pictures may appear for subsequent selection, preferably based on the context of the existing text. Upon completion of the desired phrase(s) and/or sentence(s), the user may initiate the audible transmission of the phrase(s) and/or sentence(s). Additionally, or alternatively, words and/or phrases may be audibly transmitted automatically as they are selected by the user in substantially real time. Such an interactive and predictive system may afford people who have difficulty speaking a fuller, more expressive vocabulary.

Further features and advantages of the systems and methods disclosed herein, as well as the structure and operation of various aspects of the present disclosure, are described in detail below with reference to the accompanying figures.

BRIEF DESCRIPTION OF THE SEVERAL VIEWS OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the invention will now be described in detail with reference to the accompanying drawing. These figures are merely provided to assist in the understanding of the invention and are not intended to limit the invention in any way. One skilled in the art will recognize that various modifications and changes may be made to any of these example embodiments without departing from the scope and spirit of the present invention.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
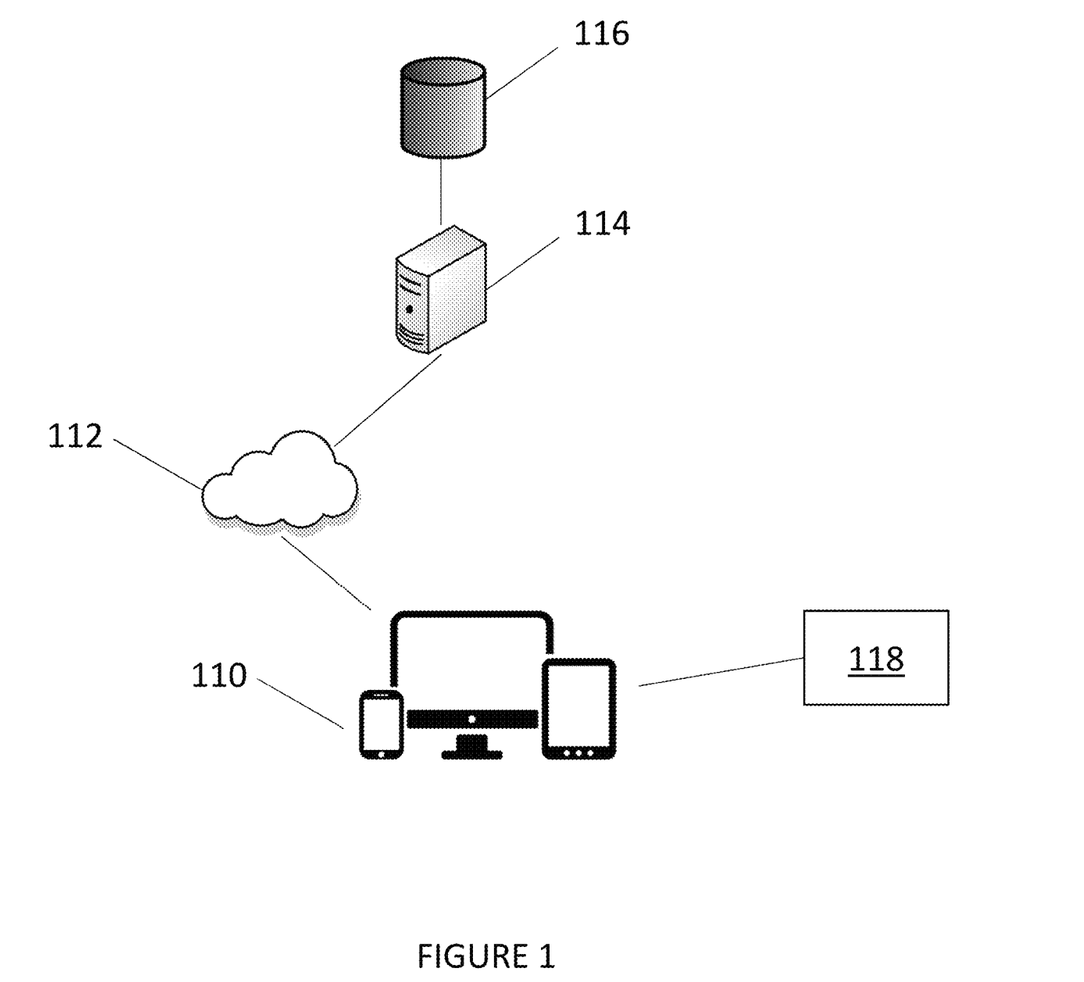
FIG. 1 is a simplified plan view of an exemplary system.

Referring to FIG. 1, a user device 110 may be in electronic communication with an external server 114. Such communication may be made by way of a network 112, such as but not limited to, an internet, intranet, cellular network, the world wide web, some combination thereof, of the like. The user device 110 may be a smart phone, laptop, desktop computer, tablet, watch, fitness tracking device, or any other electronic device(s), preferably capable of visually displaying and updating text and audibly transmitting selected words and/or phrases, directly or indirectly, such as through separate speakers. An application may be installed on the user device 110. In other exemplary embodiments, the user device 110 may be a specially designed alternative communication device having the application pre-installed thereon. In still other exemplary embodiments, without limitation, the application may be a web-based platform accessibly by way of the user device 110. In such embodiments, only a minimal amount of program data may be stored at the user device 110 and the majority of program data may instead be stored in one or more remote databases 116 and/or the one or more servers 114. Such databases 116 may be in electronic communication with the user device 110 by way of the external server 114 and/or the network 112.

The database 116 and/or the user device 110 may comprise one or more non-transitory computer-readable mediums which may comprise a variety of software instructions and/or user data. In exemplary embodiments, the database 116 and/or the user device 110 may comprise a number of words, phrases, and images, each associated with one or more context cues. As further described herein, any number and type of context cues are contemplated such as, but not limited to, other words, phrases, or images, user location, time of day, user mood, some combination thereof, or the like.

In exemplary embodiments, the application configures the user device 110 to execute one or more software instructions, which may comprise one or more predictive algorithms. When executed, the software instructions and/or predictive algorithms may gather information from the user device 110 and/or the database 116 and uses the gathered data to select for display the next words or phrases likely to be entered by the user. For example, without limitation, words, phrases, and/or images associated with the user's current context may be gathered and displayed at the user device 110 for selection. The selected words, phrase, or images may be audibly transmitted as selected, or may be displayed in an updating text and the user may elect to audibly transmit the text once formed to the user's satisfaction.

Figure 2:
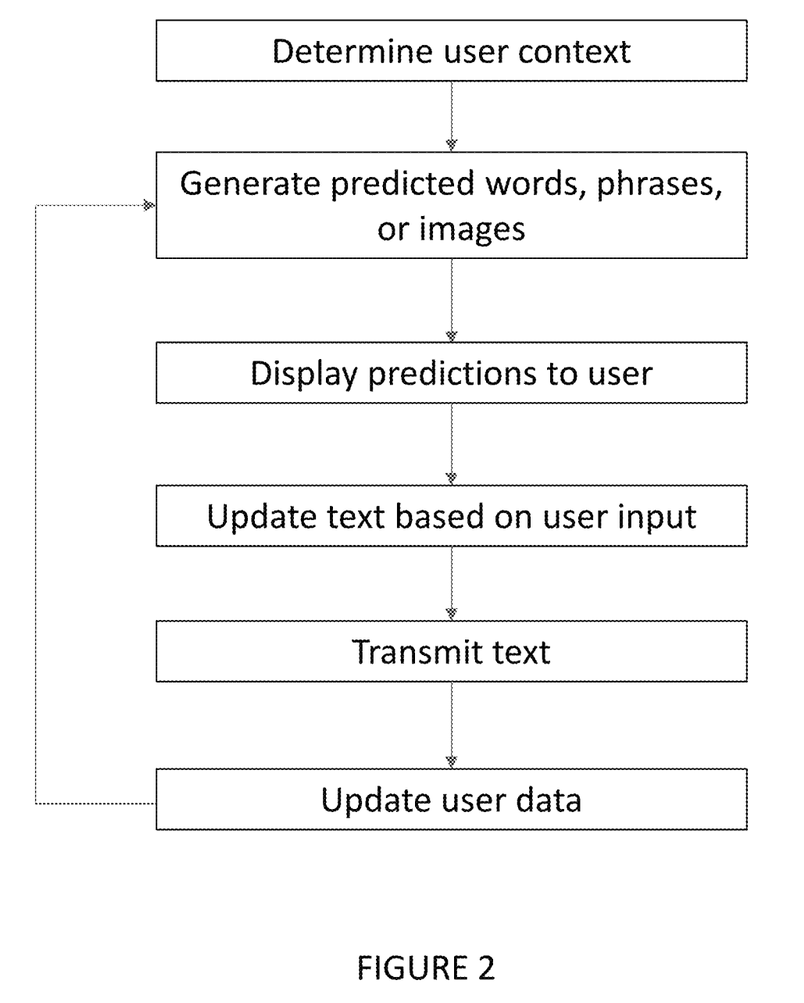
FIG. 2 is a simplified block diagram illustrating exemplary logic for use with the system of FIG. 1.

FIG. 2 is a simplified block diagram with exemplary logic for use with the system of FIG. 1. Predicted words, phrases, or images may be generated. In exemplary embodiments, the user device 110 may draw upon data stored at the database 116 and/or locally on the user device 110 to generate the predicted words, phrases, or images relevant to the determined context. For example, without limitation, context specific predicted words or phrases may be provided based on user location, time of day, mood, some combination thereof, or the like. However, any number and type of context clues are contemplated.

The predicted words, phrases, or images may be displayed to the user at the user device 110. The user device 110 may await user input. The user device 110 may update the displayed text according to the user selection. If required, the entire, or just the updated portion, of the text may be audibly transmitted. The user data may be updated at the database 116 and/or locally on the user device 110. In exemplary embodiments, the words, phrases, and/or images selected may be recorded in association with the user context such that such words, phrases, and/or images may be generated for display and user selection when the user is in the same or similar context at a future time. Each time a user selects particular words, phrases, and/or images, such words, phrases, and/or images may more often be generated for display and user selection.

The application, potentially comprising one or more predictive algorithm(s), may rely on a number of factors and sources of information to assist in accurate prediction of likely next words or phrases. The factors and sources of information may include a general predictive formula that draws upon known word combinations, or corpora. Such corpora may be taken from works of literature, newspapers, movie or television show scripts, or any other written text or audible words. These works may be taken from a variety of languages to permit international application of the inventive system.

Alternatively, or additionally, the predictive algorithm(s) may draw upon is the actual words, sentences, or phrases previously entered by the user to speak, preferably in the same or similar contexts as a current context. For example, without limitation, a user may have previously caused the user device 110, by way of the application, to speak the phrase "I need to go to the" followed by a particular word(s) or phrase. The user may then frequently have caused the user device 110, by way of the application, to speak the phrase "doctor", "bathroom", "house", "store", "office", "park", some combination thereof, or the like, just to name a few examples, without limitation. In such cases, the application may be configured to recognize that after speaking the phrase "I need to go to the", the user's next word(s) or phrase is commonly one of such places. The user device 110, by way of the application, may be configured to generate such word(s) or phrases for selection.

After selecting the next phrase, such as "doctor", the application may be configured to recognize that after speaking "doctor", the user's next word(s) or phrase is commonly one of temporal context such as "now", "later", "tomorrow", explanation such as "because", some combination thereof, or the like, just to name a few examples, without limitation. The user device 110, by way of the application, may be configured to generate such word(s) or phrases for selection. Alternatively, the user may be finished after adding doctor and the user may indicate that the text is ready for audible transmission. After audibly transmitting the sentence, the user's preferences may be updated at the database 116 and/or the user device 110. In such situations, the user's preferences may associate the words with the user's present context such as, but not limited to, the user's location, time of day, mood, some combination thereof, or the like.

As another example, without limitation, a user may have previously caused the user device 110, by way of the application, to speak the phrase "How are you?" many times a day. A common response from the listener may be "I am well, how are you?" The user may then frequently have caused the user device 110, by way of the application, to speak the phrase "Great, thanks for asking." in response. The application may be configured to recognize that after speaking "How are you?" the user's next sentence is often a response about how the user is doing. More specifically, the application may be configured to predict a preselected phrase the user has previously spoken in similar situations, in this case the phrase, "Great, thanks for asking." Additionally, the user may begin typing the response, for example without limitation, G, R, E, and the algorithm may be configured to update and fill in the phrase for the user. For example, without limitation, the application may either put in the initial word "Great" or the entire phrase commonly spoken by the user or by the general predictive formula "Great, thanks for asking."

In other embodiments, the user device 110 may be capable of listening to external speech, for example without limitation, by way of one or more microphones. The user device 110 may be configured to capture external speech and use the external speech as an input to determine context for potential responses. In this way, the application may be updated based not only on the most common phrases the user selects, but also on the most common phrases the user hears as well as the user's most common responses thereto. Such sentences, phrases, or words may be associated with various users and stored at the database 116 for use by the application in generating predicted sentences, phrases, or words.

Alternatively, or additionally, the application may be configured to make such predictions by drawing on more than just the number of times a phrase has been spoken. For example, without limitation, such predictions may, alternatively or additionally, also be based on context such as, but not limited to, the time of day, how recently the phrase was spoken, and/or the location of the user. For example, if the application is being utilized early in the morning, as determined by the user device 110, the application may generate an initial set of phrases commonly spoken in the morning. Examples of such phrases may include, but are not limited to, "Good morning," "How did you sleep," or "I would like a cup of coffee." Such sentences, phrases, or words may be associated with various times of day and stored at the database 116 for use by the application in generating predicted sentences, phrases, or words. Of course, these are just examples and they are not intended to be limiting. Those of skill in the art will realize that the predictions may be made based on any number and type or context factors.

The application may be further configured to provide predictions based on how recently the phrase was spoken. For example, without limitation, a person may go through a phase of calling acquaintances "friend." "Hello there, friend." "How are you doing, friend?" However, habits change and so should the predictive algorithm. Just because two months ago the user used to say "friend" often, does not mean that user's mannerisms have not changed since then. For example, without limitation, the application may be configured to determine that the user has recently being using different words, phrases, or sentences such as "Hello there, buddy" or "What is going on, bud?" The application may be configured to recognize that recently the user has been using the word "buddy" or "bud" instead of "friend" and generate predictive words or phrases for display and selection accordingly. This may allow for a more fluid speaking application which more accurately adopts to the mannerisms of the user to better reflect his or her natural persona, *charisma*, and the like. Such sentences, phrases, or words may be associated with various users and stored at the database 116 and/or user device 110 for use by the application in generating predicted sentences, phrases, or words.

The application may be further configured, alternatively or additionally, to generate predicted words and phrases based on the location of the user device 110. In exemplary embodiments, the user device 110 may comprise one or more location detection devices configured to automatically determine the user's location. In other exemplary embodiments, the user device 110 may be configured to accept manual entry of a location. Such sentences, phrases, or words may be associated with various locations and stored at the database 116 for use by the application in generating predicted sentences, phrases, or words.

This location can be small in scale, such as different rooms of the house: bedroom, bathroom, kitchen. This location may be large in scale, such as recognizing the city or state the user is located in. Common phrases such as, but not limited to, "I am hungry." or "What are we having for dinner." may appear when the application determines that the user is in the kitchen. Other phrases such as, but not limited to, "Please help me make my bed." or "What show would you like to watch?" might be generated when the user device 110 determines that the user device 110 is in the appropriate room of the home. Similarly, if the user device 110 were to determine a location of Washington D.C., where the user is vacationing for example, the application may be configured to generate a sentence starting in "I want to go to . . ." may be followed by predictions of "the Washington Monument," "the White House," or "the Smithsonian Institution." Conversely, when the user device 110 determines that the user is at home, the application may be configured to generate a sentence starting with, for example without limitation, "I want to go to . . ." may be followed by predictions of the user's favorite book store or restaurant, for example without limitation. Such points of interest may be stored at the database 116 for use by the application in generating predicted sentences, phrases, or words.

In exemplary embodiments, the user device 110 may be configured to prompt and receive user input regarding points of interests. For example, without limitation, the user may enter the name of commonly visited restaurants, stores, parks, or the like. Such preferences may be stored at the database 116 for use by the application in generating predicted sentences, phrases, or words. The user device 110 may be further configured to prompt and receive user input regarding various locations. For example, without limitation, the user may indicate that a particular location is the user's home, bedroom, kitchen, relative's house, friend's house, favorite restaurant, favorite store, favorite park, and the like. Such preferences may be stored at the database 116 and/or user device 110 for use by the application in generating predicted sentences, phrases, or words.

Although the factors of corpora, location, time of day, and past use are described above, such examples are not intended to be limiting. Any means of predicting speech may properly be within the scope and spirit of this application. For example, without limitation, the user device 110 may be configured to detect the user's mood. Such mood detection may be accomplished by way of facial recognition technology, heartbeat detection, perspiration levels, pupil dilation, respiratory rate, user input, some combination thereof, of the like. Such detection may be made directly by the user device 110 or through one or more monitoring devices 118 in communication with the user device 110. Such monitoring devices 118 may include, without limitation, smart watches, fitness trackers, vitals monitoring devices, or the like. For example, without limitation, the user device 110 and/or one or more peripheral devices 118, may be configured to detect depression, anxiety, agitation, happiness, some combination thereof, or the like. The application may be configured to generate predicted words or phrases based on the user's determined mood. Such sentences, phrases, or words may be associated with moods and stored at the database 116 and/or user device 110 for use by the application in generating predicted sentences, phrases, or words.

Alternatively, or additionally, the application, for example without limitation, may be configured to display emergency phrases such words as "Help!" or "Look out!" for display and user selection and conversion to speech where anxiety, elevated heartbeat, shallow respiration, increased perspiration, or the like is detected. Such a prediction may be needed to quickly alert and grab the attention of others nearby. Furthermore, such emergency phrases may be made available at the user device 110 regardless of the ability to track various moods. Such emergency phrases may be made available by depressing one or more emergency buttons or upon initial access to the user device 110 or application, for example without limitation.

Figure 3A:
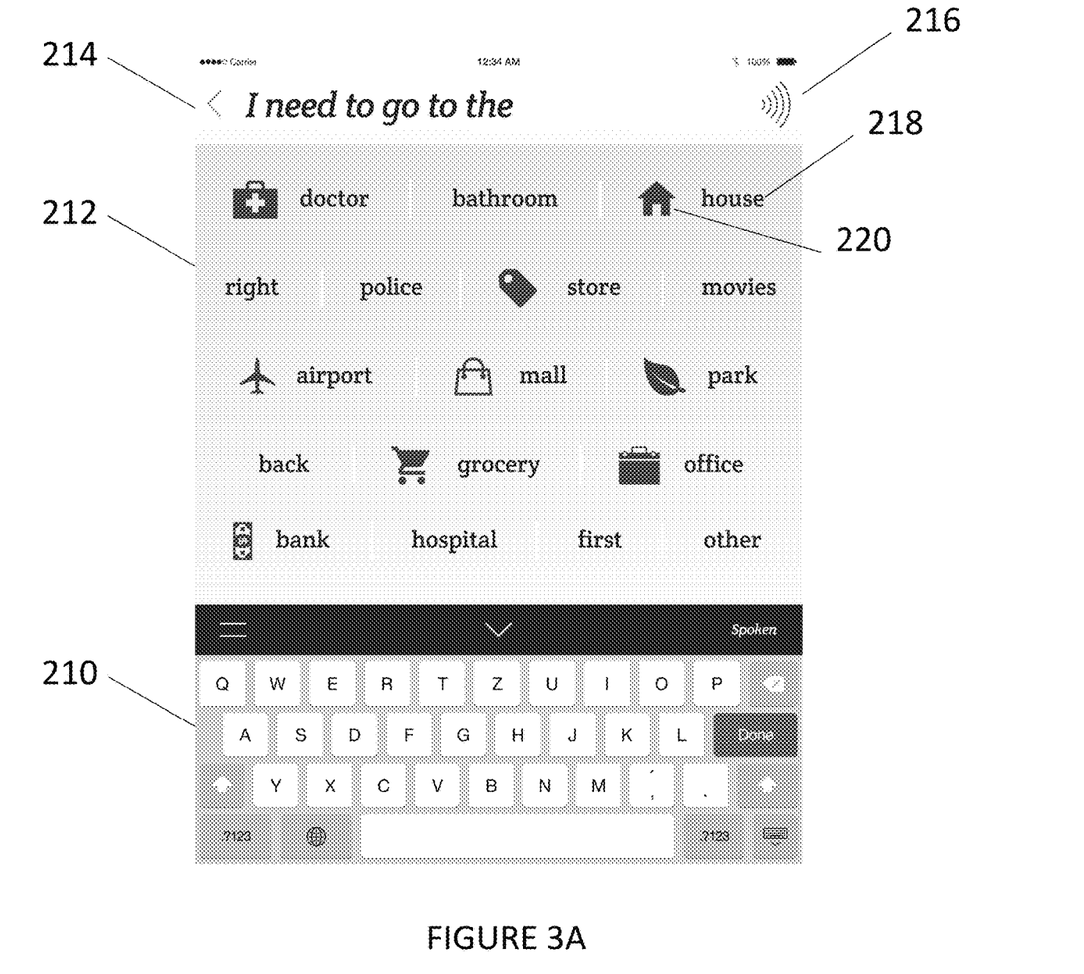
FIG. 3A depicts an exemplary user-interface for use with the system of FIG. 1.
Figure 3B:
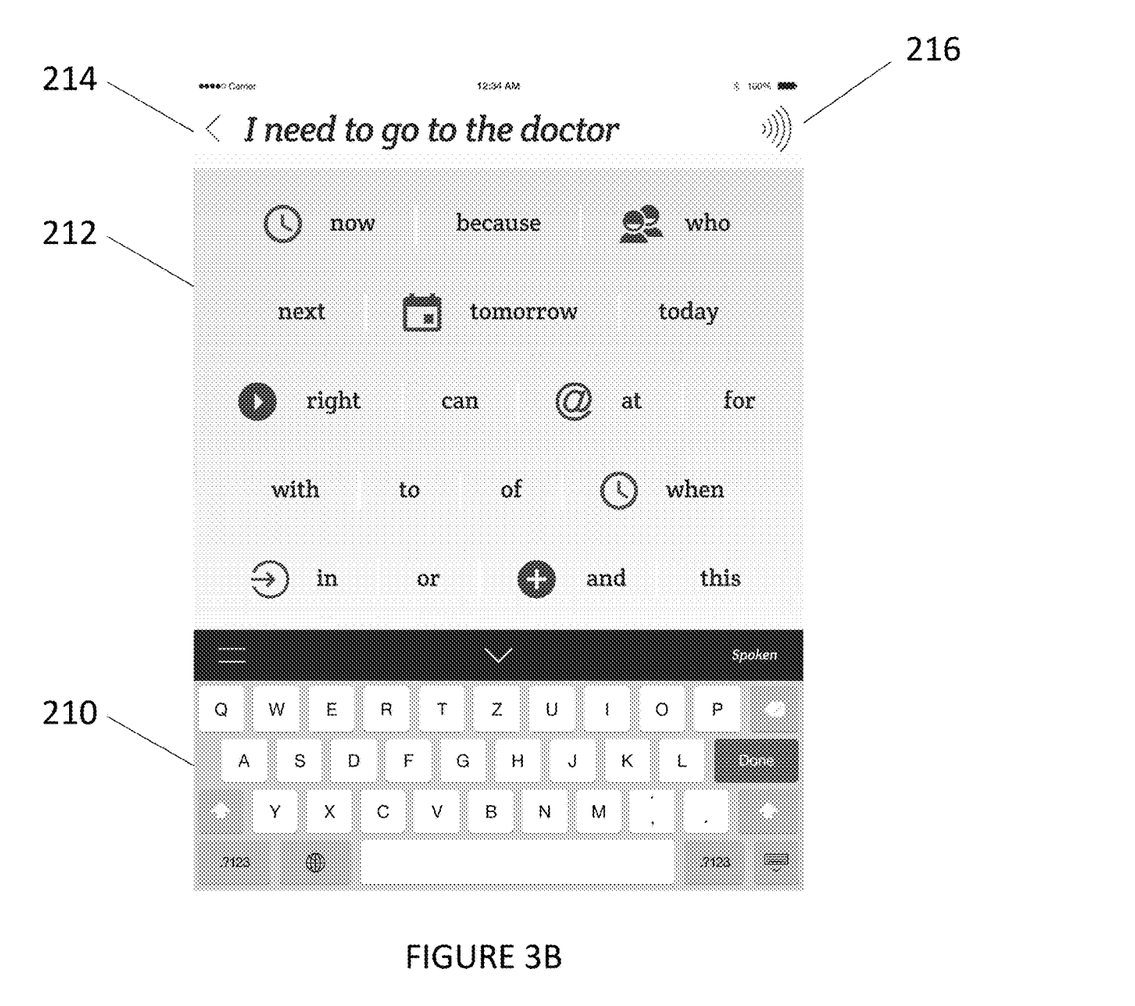
FIG. 3B depicts an updated exemplary user interface for use with the system of FIG. 1.

Referring additionally to FIG. 3A and FIG. 3B, an exemplary user interface is depicted. The interface may comprise a keyboard 210. In exemplary embodiments, the application may be configured to display the keyboard 210 at all times. The application may be further configured to display a predictive field 212 comprising a number of predicted words, phrases, images, some combination thereof, or the like. The predictive field 212, in exemplary embodiments, may be displayed above the keyboard 210. The application may be configured to display a text field 214 above the predictive field 212. As the user types or selects one or more of the predicted words or phrases 212, the text field 214 may be automatically updated to reflect the words or phrases selected from the predictive field 212. The predictive field 212 may be updated as the user types or selects a word or phrase.

In the depicted example of FIG. 3A, the user has already selected, or the application has already generated, the initial phrase "I need to go to the". Such user selection may be made, for example without limitation, by typing or selecting such predicted words or phrases from the predictive field 212. As another example, without limitation, the initial phrase may be automatically populated or provided within a list of other possible initial phrases based on the user's location, time of day, preference, mood, some combination thereof, or the like. The application may be configured to generate and display a set of possible next words in the predictive field 212. The user device 110 may be configured to accept user input at the keyboard 210 or the predictive field 212. For example, without limitation, if the user were to type the letter "b" next, the application may be configured to update the predictive field 212 with only words and phrases beginning with the letter "b:", such as bank, backyard, and bathroom in the illustrated example. The user device 110 may also be configured to receive user input indicating the selection of one or more of the words, images, or phrases display in the predictive field 212. In exemplary embodiments, the words, without limitations, the words, phrases, images, or sentences in the predictive field 212 may be determined be the algorithm. The algorithm may, for example without limitation, may select the words, phrases, images, or sentences in the predictive field 212 by the user's location, time of day, mood, preference, some combination thereof, or the like.

In the depicted example of FIG. 3B, the user has selected the predicted word "doctor." The application may be configured to display an updated text field 214 as well as an updated predicted field 212. All fields may update in substantially real time to provide for fluid communication and minimal delay for the user in crafting a complete sentence(s) or phrases.

The user device 110 may be configured to monitor for user input indicating the selection of the audio button 216. Upon determination that such a selection has been made, the application may be configured to audibly transmit the current text field 214. Such transmission may be achieved using speech to text software. Such transmission may be made by way of speakers at the user device 110 or at another location. For example, without limitation, the speakers may be wirelessly connected by a near field transmission system. As another example, without limitation, the speakers may be provided at the user device 110. Once the sentence is transmitted, the application may be configured to return to the initial page with a blank line 214. Although only single words are depicted in FIGS. 3A and 3B for the predictive field, 212 phrases, images, or the like may be used to add further ease of operation. In FIG. 3B, some common phrases may be, for example without limitation, "because I have an appointment" or "for my yearly check-up."

In exemplary embodiments, without limitation, context may be the present date, day of the week, or the like. For example, without limitation, the user device 110 may be configured to sync with a calendar, planner, to-do list, appointment reminder, or other application installed on the user device 110 and/or one or more peripheral devices 118. The context cue may include the name, time, date, location, or other information regarding appointments, dates, events, reminders, to-do's, or the like stored on such other applications. For example, without limitation, the application may be configured to generate the phrase "When are we leaving for my hair appointment" a predetermined time before the scheduled event for a haircut. As a further example, without limitation, context may comprise the day of the week. For example, without limitation, an initial phrase "Let's go to . . . " may be selected, and because the day of the week is Sunday, "Church" may be generated as a potential further word for selection. The user may be know to visit particular places certain days The location, font, arrangement, orientation, style, and the like of the keyboard 210, the predicted words or phrases 212, the text field 214, and the audio button 216 are merely exemplary and are not intended to be limiting. Any location, font, arrangement, orientation, style, and the like are contemplated.

In exemplary embodiments, the application may be configured to generate, for display at the user device 110, an initial interface upon initial access to the application or transmission of a sentence. The initial interface may provide a variety of options for selection by the user to begin a sentence. The initial interface may comprise a set of common openings to sentences or phrases, such as but not limited to, "I need to go to the . . . ," "Hello." or "Excuse me." Shorter selected phrases or sentences may automatically be audibly transmitted such that the user is not required first select "Hello" and then also select the audio button 216. The initial interface may also permit a user to select a more pointed category of speech to predict from. Such categories may include, for example without limitation, workplace, home, or vacation. For a workplace example, the user may be able to retain an employment position as a host or hostess of a restaurant. Common phrases such as, without limitation, "Hello," "How many in your party?" "Please follow me," or "The wait will be about . . . " may permit more natural conversation with customers. One of ordinary skill in the art will recognize that this is merely one workplace example of how only a few short phrases readily available may open employment opportunities previously not available. Such initial phases or short sentences may be automatically determined by the algorithm or may be manually selected or entered by the user. For example, without limitation, the user may pre-program a set of work phrases, home phrases, transportation phrases, or the like. As a further example, without limitation, a user may select certain phrases or sentences to be added to a favorites list.

In exemplary embodiments, each of the words or phrases generated and display in the predictive field 212 may comprise a combination of words 218 and pictures 220. This may be particularly beneficial immediately after a tragic incident has occurred leaving the user with speech difficulties. It may be difficult to determine the user's cognitive ability at this time and both the pictures and words may form an association within the user's mind allowing him or her to communicate with greater ease. Additionally, the user may be drawn to a picture more readily and may be able select the associated picture faster than reading all words in the predictive field 212.

In exemplary embodiments, an image may be displayed adjacent to, or otherwise in association with the words or phrases in the predictive field 212. In this way, the user may associate the image with the word or phrase. This may permit for easier selection. For example, without limitation, an image of a plane may be displayed next to the word "airport" and/or an image of a dollar bill may be displayed next to the word "bank". As a further example, without limitation, the "@" symbol may be displayed next to the word "at", or the "+" sign may be displayed next to the word "and". Such images may be used for some or all of the words or phrases in the predictive field 212. Such images may be associated with words and/or phrases as stored at the database 116 and/or the user device 110.

In exemplary embodiments, additional words, phrases, or images may be generated for display in the predictive field 212 by user input. For example, without limitation, additional words, phrases, or images may be generated by scrolling down through the generated list of words, phrases, or images. Upon reaching the end of the list, additional words, phrases, and images may be retrieved and displayed at the predictive field 212 as described herein. Alternatively, or additionally, one or more buttons may be available for user selection which cause the additional words, phrases, and images to be retrieved and displayed.

Any embodiment of the present invention may include any of the optional or exemplary features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers of specialized computing device. The electronic devices may be personal computers, smartphone, tablets, databases, servers, or the like. The connections described herein may be accomplished by wired or wireless means. Selections described herein may be made directly, such as but not limited to, by way of one or more touch screen, or indirectly such as, but not limited to, by way of separate movement and selection devices, mouse, stylus, track pad, or the like.

What is claimed is:

1. A system for assisting a user with a speech impairment provide audible communication to others in audible range of the user through predictive language choice options, said system comprising:
   a user device associated with the user and comprising a display and at least one speaker;
   a database comprising words, phrases, images, and initial phrases comprising various combinations of some words, phrases, and images, wherein each of the words, phrases, images, and initial phrases are associated with the one or more context cues, and wherein at least some of the context cues are other ones of said words, phrases, images, and initial phrases; and
   an electronic storage device comprising software instructions, which when executed by a processor, configure the user device to:
   determine an user context for the user;
   query the database to retrieve said initial phrases associated with said one or more context cues matching said initial user context;
   display, at a predictive field of the user device, said initial phrases retrieved from said database based on said initial user context;
   monitor for user input indicated selection of one of said initial phrases displayed at the predictive field;
   display, at a text field of the user device, the selected one of the initial phrases;
   determine a further user context for the user bases, at least in part, on said selected one of the initial phrases;
   query the database to retrieve said words, phrases, images associated with said one or more context cues matching the further user context;
   display, at the predictive field, the words, phrases, images retrieved from said database based on said further user context;
   monitor for user input selecting one or more of the words, phrases, and images displayed at the predictive field;
   update the text field to also display the selected one or ones of the words, phrases, and images with the selected one of the initial phrases; and
   audibly transmitting words, phrases, and literal equivalents of the images displayed at the text field through said at least one speaker.

2. The system of claim 1 wherein:
the one or more context cues comprise one or more complete sentences such that the words, phrases, images displayed at the predictive field form partial or complete sentences when added to the words, phrases, and literal equivalents of images displayed at the text field.

3. The system of claim 1 wherein:
the user device is selected from a group consisting of: a smartphone and a tablet.

4. The system of claim 3 wherein:
the one or more context cues comprise one or more locations;
the initial user context comprises a current location; and
the user device is configured to determine the current location based on electronic position measurement of the user device and store, at the database, the words, phrases, and images selected for audible transmission by the user such that each of said words, phrases, and images matching those selected for audible transmission are associated with a location as one of said one or more context cues at said database following audible transmission by said user.

5. The system of claim 3 wherein:
the one or more context cues comprise one or more times of day;
the initial user context comprises a current time of day; and
the user device is configured to determine the current time of day, and store, at the database, the words, phrases, and images selected for audible transmission by the user such that each of said words, phrases, and images matching those selected for audible transmission are associated with the current time of day as one of said one or more context cues at said database following audible transmission by said user.

6. The system of claim 1 further comprising:
one or more peripheral devices, each in electronic communication with the user device, and each configured to track a user measurement selected from a list consisting of: heart rate, respiration rate, and perspiration rate, wherein one or more context cues comprise one or more moods, wherein the electronic storage device comprises additional software instructions, which when executed by the processor, configure the processor to:
retrieve measurements from the one or more peripheral devices; and
determine a user's mood based on the retrieved measurements, wherein the initial user context comprises the determined user's mood.

7. The system of claim 6 wherein:
the electronic storage device comprises additional software instructions, which when executed by the processor, configure the processor to store, at the database, words, phrases images, and sentences selected for audible transmission by the user such that each word, phrase, image, and sentence is associated with user's mood as one of said one or more context cues at said database following audible transmission by said user.

8. The system of claim 1 wherein:
the one or more context cues comprise user identities;
the initial user context comprises a current user identity; and
the electronic storage device comprises additional software instructions, which when executed by the processor, configure the processor to:
determine the current user identity for the user of the user device; and
store, at the database, the words, phrases, and images selected for audible transmission by the user such that each of said words, phrases, and images matching those selected for audible transmission are associated with the current user identity as one of said one or more context cues at said database following audible transmission by said user.

9. The system of claim 1 further comprising:
a microphone associated with the user device, wherein the electronic storage device comprises additional software instructions, which when executed by the processor, configure the processor to monitor, by way of the microphone, for words, phrases, and sentences spoken by others, wherein the initial user context the comprises the words, phrases, and sentences spoken by others such that the initial phrases, words, phrases, and images retrieved from the database include those commonly used in response to the words, phrases, and sentences spoken by others as detected by said microphone.

10. The system of claim 1 wherein:
initial phrase as well as said words, phrases, or literal equivalents of said images are audibly transmitted automatically and individually as each of said initial phrase, words, phrases, and said images are selected at said user device to provide an ongoing audible transmission as sentences are being formed within said text field.

11. The system of claim 1 wherein:
the electronic storage device comprises additional software instructions, which when executed by the processor, configure the processor to:
monitor for user input selecting an audio transmission button; and
upon receipt of user input indicating the selection of the audio transmission button, audibly transmit all of the word, phrases, or literal equivalents of the images displayed within the text field.

12. A method for assisting a user with a speech impairment provide audible communication to others in audible range of the user through predictive language choices options, said method comprising the steps of:
providing a database comprising a number of words, phrases, images, and initial phrases comprising various combinations of some words, phrases, and images, wherein each of said words, phrases, and images are associated with one or more context cues, and wherein at least some of the one or more context cues are other ones of said words, phrases, images, and initial phrase;
determining an initial context for the user;
querying the database for said initial phrases associated with said one or more context cues matching said initial user context;
displaying, at a predictive field of the user device, said initial phrases retrieved from said database based on said initial user context;
monitoring for user input indicating selection of one or said initial phrases displayed at the user device;
displaying, at a text field of the user device, the selected one of said initial phrases;
determining a further user context based, at least in part, on said selected one of the initial phrase;
querying the database to retrieve said words, phrases, or images associated with the further user context;

displaying, at the predictive field, the words, phrases, or images retrieved from the database based on said further user context;

monitoring, at the user device, for user input indicating selection of one of the words, phrases, or images displayed at the predictive field;

updating the text field to also display the selected one or more of the words, phrases, or images within a text field with the selected one of the initial phrases; and audibly transmitting words, phrases, or literal equivalents of the images displayed within the text field.

13. The method of claim 12 wherein:

the one or more context cues comprise locations and times of day;

the initial context and the further context include a current location of the user device, wherein said user device is configured to determine the current location based on one or more electronic position measurements; and the initial context and the further context include a time of day as determined by a timekeeping device at the user device.

14. The method of claim 12 wherein:

said initial phrase as well as said words, phrases, or literal equivalents of said images are audibly transmitted automatically and individually as each of said initial phrase, words, phrases, and images are selected at said user device to provide an ongoing audible transmission as sentences are being formed within said text field.

15. A system for assisting users with speech impairments provide audible communication to others in audible range of a user through predictive language choice options, said system comprising:

a number of smartphones, each associated with a respective one of said users, and each comprising a touch-sensitive display and a speaker;

a database comprising words, phrases, images, and initial phrases comprising various combinations of some words, phrases and images, wherein each of the words, phrases, images, and initial phrase are associated with ones or more context cues comprising: user identities, times of day, locations, and other ones of said words, phrases, and images, and initial phrases; and a server in communication with each of said and comprising software instructions, which when executed by a processor on a respective ones of the smartphones, configures the respective smartphone to:

determine a location of the respective smartphone;

determine, at the respective smartphone, a current time;

determine a user identity associated with the respective smartphone;

query the database for a selection of most commonly used ones said initial phrases associated with the user identity, the location, and the current time;

display the initial phrases retrieved from the database within a predictive field at the respective smartphone;

monitor for user input at the respective smartphone indicating selection of one of the initial phrase displayed within the predictive field of the respective smartphone;

update a text field of the respective smartphone to display the selected initial phrase;

query the database for a selection of most commonly used ones of said words, phrases, and images associated with the selected initial phrase;

display the words, phrases, or images retrieved from the database within the predictive field of the respective smartphone;

monitor for user input at the respective smartphone indicating selection of one or more of the words, phrases, and images displayed within the predictive field;

update the text field of the respective smartphone with the words, phrase, and images displayed at the predictive field;

monitor for user input selecting an audio transmission button at the respective smartphone;

upon receipt of user input from the respective smartphone indicating selection of the audio transmission button, audibly transmit, at the respective smartphone, an initial phrase, the words, phrases, and literal equivalents of images located within the text field by way of the speaker of the respective smartphone; and update the database to associate each of the initial phrase, words, phrases, and images selected for audible transmission at the respective smartphone with the user identity, the location, the current time, and the other ones of the words, phrases, or images selected for audible transmission for the respective smartphone.

16. The system of claim 1 wherein:

the electronic storage device comprises additional software instructions, which when executed by the processor, configure the processor to query the database for additional ones of said words, phrases, or images associated with one or more of said context cues matching the further user context where user input is received indicating scrolling by said user through all of the returned words, phrases, or images currently displayed at said predictive field at the user device.

17. The system of claim 1 wherein:

at least one of said images is configured for display with at least one equivalent one of said words or phrases in a unitary manner.

18. The system of claim 1 wherein:

the database, the electronic storage device, and the processor are located at said user device.

19. The system of claim 1 wherein:

said further user context is also based on said initial context.

20. The system of claim 1 wherein:

said database comprises one or more emergency phrases; and said electronic storage device comprises additional software instructions, which when executed by a processor, configure the user device to:

display an emergency button;

display said one or more emergency phrases upon receipt of data indicating user selection of said emergency button; and automatically and audibly transmit selected ones of said one or more emergency phrases through said at least one speaker upon receipt of data indicating user selection of any of said displayed ones of said one or more emergency phrases.

* * * * *

UNITED STATES PATENT AND TRADEMARK OFFICE
CERTIFICATE OF CORRECTION

PATENT NO.        : 11,145,313 B2                                          Page 1 of 1
APPLICATION NO.   : 16/502119
DATED             : October 12, 2021
INVENTOR(S)       : Michael Bond It is certified that error appears in the above-identified patent and that said Letters Patent is hereby corrected as shown below:

In the Claims

Column 11, Claim 2, Line 4, insert -- and -- before images displayed...
Column 12, Claim 10, Line 24, delete "initial phrase" and insert -- initial phrases --.
Column 12, Claim 12, Line 55, delete "said one more context clues" and insert -- the one or more context cues --.
Column 13, Claim 15, Line 40, delete "and initial phrase" and insert -- and initial phrases --.
Column 13, Claim 15, Line 45, insert -- smartphones -- before and comprising...
Column 13, Claim 15, Line 59, delete "initial phrase" and insert -- initial phrases --.

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*